United States Patent [19]

Tunney et al.

[11] Patent Number: 5,384,376

[45] Date of Patent: Jan. 24, 1995

[54] ORGANIC/INORGANIC HYBRID MATERIALS

[75] Inventors: Scott E. Tunney, Ontario; Gary A. Rakes, Rochester; Bradley K. Coltrain, Fairport, all of N.Y.

[73] Assignee: Eastman Kodak Company, Rochester, N.Y.

[21] Appl. No.: 996,387

[22] Filed: Dec. 23, 1992

[51] Int. Cl.$^6$ ............................................. C08L 77/00
[52] U.S. Cl. ..................... 525/431; 525/474; 525/479; 525/521; 525/535
[58] Field of Search ............... 525/431, 474, 479, 521, 525/535

[56] References Cited

U.S. PATENT DOCUMENTS

| | | | |
|---|---|---|---|
| 4,889,901 | 12/1989 | Shama et al. | 526/279 |
| 4,962,156 | 10/1990 | Shinjo et al. | 525/100 |
| 5,182,174 | 1/1993 | Stephenson | 525/431 |

OTHER PUBLICATIONS

Mikhail G. Voronkov and Vladimir I. Lavrent'yev, "Polyhedral Oligosilsesquioxanes and Their Homo Derivatives," pp. 199–236 (1982).

Bruce M. Novak, Mark Ellsworth, Tom Wallow and Caroline Davies, "Simultaneous Interpenetrating Networks of Inorganic Glasses and Organic Polymers. New Routes into Nonshrinking Sol-Gel Derived Composites", *Dept. of Chemistry, University of California at Berkley*, pp. 698–700 (1990).

John Lee W. Noell, Garth L. Wilkes, Dillip K. Mohanty, and James E. McGrath, "The Preparation and Characterization of New Polyether Ketone-Tetraethylorthosilicate Hybrid Glasses by the Sol-Gel Method", *Journal of Applied Polymer Science*, vol. 40, pp. 1177–1194 (1990).

Mark W. Ellsworth and Bruce M. Novak, "Mutually Interpenetrating Inorganic-Organic Networks, New Routes into Nonshrinking Sol-Gel Composite Materials", *J. Am. Chem. Soc.*, vol. 113, pp. 2756–2758 (1991).

Bruce M. Novak and Caroline Davies, "Inverse Organic-Inorganic Composite Material. Free Radical Routes into Nonshrinking Sol-Gel Composites", *Dept. of Chem., University of California at Berkeley*, pp. 512–513 (1990).

Primary Examiner—John C. Bleutge
Assistant Examiner—Mark D. Sweet
Attorney, Agent, or Firm—Robert A. Gerlach

[57] ABSTRACT

A novel organic/inorganic hybrid material has been discovered comprising a functionalized silsesquioxane and an organic component having reactive endgroups wherein the organic backbone of the organic component is selected from polyimides, polyquinoxolines, polyether ketones, polyether sulfones, and polyesters. The hybrid materials are useful as films that may be employed as reinforced plastics, lightweight metal replacements, and as coatings.

14 Claims, No Drawings

ORGANIC/INORGANIC HYBRID MATERIALS

FIELD OF THE INVENTION

The present invention describes novel organic/inorganic hybrid materials.

BACKGROUND OF THE INVENTION

Organic-inorganic hybrid materials offer the opportunity to combine the desirable properties of organic polymers, such as, for example, processability, toughness, and impact strength, with the desirable properties of inorganic materials, such as, for example, high temperature stability, durability, and high modulus.

Silsesquioxanes are polymeric silicate materials of the type $RSiO_{1.5}$ where R is an organic substituent. It is known how to synthesize silsesquioxane polymers containing reactive organic functional groups such as, for example, phenyl, chlorophenyl, vinyl, or methacryl. Additionally, polysilsesquioxanes with polystyrene arms have been synthesized by reacting polystyrene with silsesquioxane copolymers of phenyl with vinyl, methacryl, or chloropropylsilicate monomers. An especially attractive feature of silsesquioxanes is that they can be quite soluble and yet exhibit virtually complete condensation.

It is known that in situ polymerization of inorganic metal alkoxides, such as, for example, tetraethoxysilane, tetramethoxysilane and phenyltrimethoxysilane in organic polymers, such as poly(tetramethylene oxide), or poly(methyl methacrylate) can generate hybrid materials exhibiting at least one of the following desirable properties: higher modulus, higher yield stress, increased breaking stress, or increased glass transition temperature ($T_g$).

Unfortunately, one of the difficulties with in situ polymerization is the shrinkage exhibited by the organic-inorganic hybrid upon drying and curing. The shrinkage has been attributed to the removal of solvent and to the continued reaction of the inorganic oxide network via condensation reactions which eliminate alcohol or water molecules. The severe stresses which develop during drying and curing frequently lead to cracking of the product material, thus limiting its potential usage for many applications. Further, there is a need to develop materials exhibiting thermal stability when exposed to high temperatures (>than about 200° C.).

It is highly desirable to produce high performance, high temperature materials. Organic-inorganic composites are generally not readily produced using high temperature organic polymers because of the difficulty of synthesizing high temperature polymers functionalized with trialkoxysilane moieties, as well as the difficulties associated with processing and characterizing the composites. Identifying common solvents for the organic polymer and the inorganic polymerization reaction can also be difficult. The discovery of alternative inorganic-organic polymers as well as materials with a high thermal stability is needed.

SUMMARY OF THE INVENTION

The problem noted above has been solved with the discovery of novel organic-inorganic hybrid compositions comprising: (a) a functionalized silsesquioxane and (b) an organic component having reactive endgroups, wherein the organic backbone of the organic component is selected from polyimides, polyquinoxolines, poly ether ketones, poly ether sulfones, or polyesters and the reactive endgroups of the organic component are independently selected from —$CO_2R$, —NRH, —$CO_2H$,

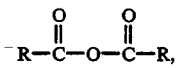

—$NH_2$, halide, or —OH groups (wherein R is a branched or straight, $C_1$-$C_{20}$ alkyl, alkenyl, alkynyl, or $C_6$-$C_{18}$ aromatic group).

The method has been found to produce high temperature, thermally stable (>than about 200° C.) hybrid materials with reduced shrinkage problems, and less volatiles. Further, when tested for solubility, the hybrids exhibited a change in solubility characteristics as compared with unreacted components, as discussed in more detail hereinafter. The inventive method results in an organic-inorganic material exhibiting high thermal stability and substantial hydrolytic stability. The hybrid material is transparent and useful in many applications, including for example, protective coatings and in fiber reinforced composites.

DETAILED DESCRIPTION

The inventive compositions of this invention are hybrid materials having inorganic and organic components covalently bound. The hybrid material is formed by a reaction between the functional organic group of the silsesquioxane and the reactive end group of the previously listed organic components to form a hybrid product having carbon-silicon linkage, as shown, for example, by the following reaction Scheme A.

REACTION SCHEME A:

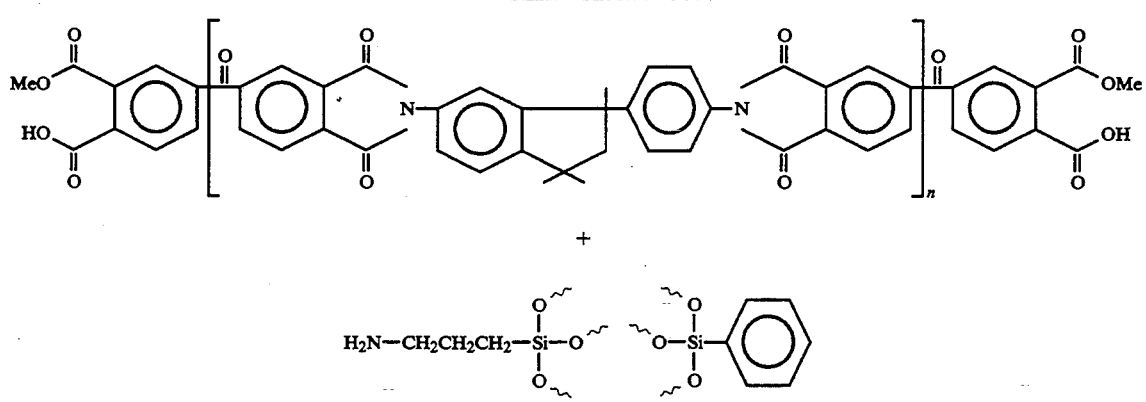

-continued
REACTION SCHEME A:

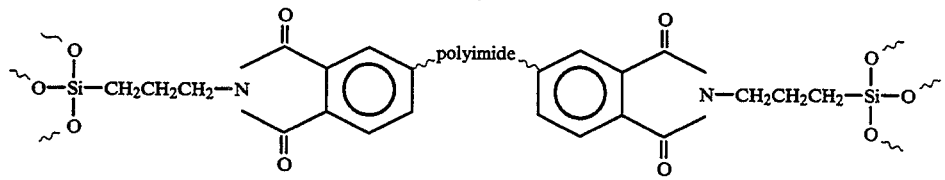

As shown, the reaction is the formation of an imide group with the polyimide oligomer end groups and the amine functionality on the silsesquioxane.

According to the invention, the silsesquioxane may be represented by the following structure I:

$$(R^1SiO_{1.5})_x(R^2SiO_{1.5})_y[(R^3)_2SiO]_z \qquad \text{I}$$

wherein $R^1$, $R^2$ and $R^3$ each independently represent substituted or unsubstituted, branched or straight chain $C_1$–$C_{20}$ alkyl, alkenyl, alkynyl groups, and $C_6$–$C_{18}$ aromatic groups, wherein said substituents may be selected from —$NH_2$, —OH, —COOH, —$CO_2R$,

—NHR, or halide (wherein R is a branched or straight, $C_1$–$C_{20}$ alkyl, alkenyl, alkynyl, or $C_6$–$C_{18}$ aromatic group), x is an integer from 0.02 to 0.50,
y is an integer from 0.98 to 0.02, and
z is an integer from 0 to 0.50, with the proviso that $R^1$ is functionalized with one or more of the listed substituents.

More preferably, $R^1$, $R^2$ and $R^3$ are selected from phenyl, methyl, ethyl, propyl, or 3-aminopropyl. Most preferably, the silsesquioxane is defined as a random copolymer, $R^1$ is a phenyl and y is from 0.98 to 0.30; $R^2$ is an aminophenyl or aminopropyl and x is 0.02 to 0.30; and $R^3$ (if present) is methyl, ethyl, or propyl and z is from 0 to 0.40.

The functionalized silsesquioxane may be prepared by numerous techniques known to those skilled in the art. For example, one convenient method is shown by Reaction Scheme B below:

REACTION SCHEME B:

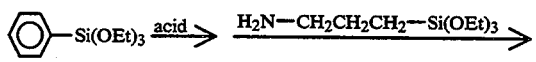

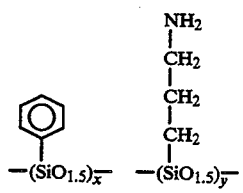

-continued
REACTION SCHEME B:

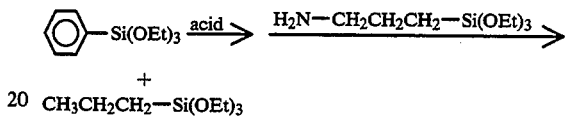

As shown by Reaction Scheme B, the two step reaction scheme describes the synthesis of a preferred phenylsilsesquioxane. Generally, the acid hydrolysis step produces cyclics and oligomers which can then be re-equilibrated to a higher molecular weight by performing the second step under basic conditions. Thus the amine-containing monomer is added in a second step because it would act as a buffer in the initial hydrolysis reaction. Additional base, such as ammonium hydroxide, may be added at the end of the reaction period to ensure that the amine groups on the silsesquioxane are not protonated (i.e. to ensure that amine salts are not present). More particularly, phenyltrimethoxysilane is hydrolyzed under acid conditions with greater than 10 equivalents of water to effect complete hydrolysis. The aminosilane monomers are preferably not added at this stage, although other non-amino comonomers such as, for example, methyl triethoxysilane, propyltriethoxysilane, chloropropyltrimethoxysilane, vinyltriethoxysilane may be included at this stage. The hydrolysis and initial condensation is then allowed to proceed for approximately 2 hours. The aminosilane monomers are then included in the reaction mixture and allowed to react for approximately 12 hours. Recovery of the silsesquioxane is then accomplished by methods known to those skilled in the art, including, for example, isolating the polymer by removing the solvent, drying, redissolving, filtering, precipitation from a non-solvent, and removing the solvent.

The organic component having reactive endgroups may be polyimide, polyquinoxoline, polyether ketone, polyether sulfone, or polyester backbone, with the reactive endgroups being the same or different, and selected from —CO$_2$R, —NRH, halide, —CO$_2$H,

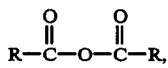

—NH$_2$, or —OH groups (where R is a branched or straight, $C_1$–$C_{20}$ alkyl, alkenyl, alkynyl, or $C_6$–$C_{18}$ aromatic group). These polymers are known and are preparable by numerous methods known to those skilled in the art.

A preferred class of organic components having reactive endgroups is the polyimides, as represented, for example, by the following structure II:

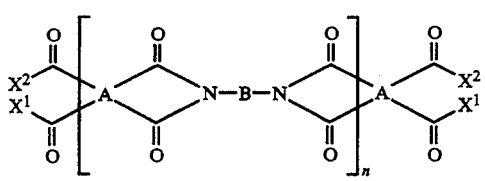

wherein n has a value from about 5 to 100, more preferably from 15 to 35, and most preferably 20 to 30. $X^1$ and $X^2$ may be the same or different defined as OR$^1$ (with R$^1$ as previously defined), OH, or O (with the proviso that when $X^1$ is O, then $X^2$ is omitted to form a cyclic endgroup); A is an aromatic tetra acid dianhydride, and B is an aromatic diamine. Representative polyimides useful in the practice of this invention can be derived from a variety of diamines and dianhydrides. The diamines that can be employed in the preparation of the polyimide useful herein include the phenylindane diamines described in U.S. Pat. No. 3,856,752, examples of which include:

5-amino-1-(4'-aminophenyl)-1,3,3-trimethylindane;
6-amino-1-(4'-aminophenyl)-1,3,3-trimethylindane,
  optionally substituted with alkyl, halogen or fluoroalkyl, and aromatic diamines, for example,
4 4'-methylenebis(o-chloroaniline) ,
3,3'-dichlorobenzidine,
3,3'-sulfonyldianiline,
4,4'-diaminobenzophenone,
1,5 -diaminonaphthalene,
bis(4-aminophenyl)diethyl silane,
bis(4-aminophenyl)diphenyl silane,
bis(4-aminophenyl)ethyl phosphine oxide,
N-(bis(4-aminophenyl))N-methyl amine,
N-(bis(4-aminophenyl))N-phenyl amine,
4,4'-methylenebis(2-methylaniline),
4,4'-methylenebis(2-methoxyaniline),
5,5'-methylenebis(2-aminophenol),
4,4'-methylenebis(2-methylaniline),
4,4'-oxybis(2-methoxyaniline),
4,4'-oxybis(2-chloroaniline),
2,2'-bis(4-aminophenol),
5,5'-oxybis(2-aminophenol),
4,4-thiobis(2 -methylaniline),
4,4'-thiobis(2-methoxyaniline),
4,4'-thiobis(2-chloroaniline),
4,4'-sulfonylbis(2-methylaniline),
4,4'-sulfonylbis(2-ethoxyaniline),
4,4'-sulfonylbis(2-chloroaniline),
5,5'-sulfonylbis(2-aminophenol),
3,3'-dimethyl-4,4'-diaminobenzophenone,
3,3'-dimethoxy-4,4'-diaminobenzophenone,
3,3'-dichloro-4,4'-diaminobenzophenone,
4,4'-diaminobiphenyl,
m-phenylenediamine,
p-phenylenediamine,
4,4'-methylenedianiline,
4,4'-oxydianiline,
4,4'-thiodianiline,
4,4'-sulfonyldianiline,
4,4'-isopropylidenedianiline,
3,3'-dimethylbenzidine,
3,3'-dimethoxybenzidine,
3,3'-dicarboxybenzidine,
2,4-tolyldiamine,
2,5-tolyldiamine,
2,6-tolyldiamine,
m-xylyldiamine,
2,4-diamino-5-chloro-toluene, and
2,4-diamino-6-chloro-toluene.

Dianhydrides that can be employed in the preparation of the polyimide believed to be useful herein include the dianhydrides described in U.S. Pat. No. 3,856,752, examples of which include phenylindane dianhydrides, such as
1-(3',4'-dicarboxyphenyl)-1,3,3-trimethylindan-5,6-dicarboxylic acid dianhydride,
1-(3',4'-dicarboxyphenyl)-1,3,3-trimethylindan-6,7-dicarboxylic acid dianhydride,
1-(3',4'-dicarboxyphenyl)-3-methylindan-5,6-dicarboxylic acid dianhydride,
1-(3',4'-dicarboxyphenyl)-3-methylindan-6,7-dicarboxylic acid dianhydride, and other dianhydrides, preferably aromatic dianhydrides or tetracarboxylic acid dianhydrides, such as
2,3,9,10-perylenetetracarboxylic acid dianhydride,
1,4,5,8-naphthalenetetracarboxylic acid dianhydride,
2,6-dichloronaphthalene-1,4,5,8-tetracarboxylic acid dianhydride,
2,7-dichloronaphthalene-1,4,5,8-tetracarboxylic acid dianhydride,
2,3,6,7-tetrachloronaphthalene-2,4,5,8-tetracarboxylic acid dianhydride,
phenanthrene-1,8,9,10-tetracarboxylic acid dianhydride,
2,3,3',4'-benzophenonetetracarboxylic acid dianhydride,
pyromellitic dianhydride,
3,3',4'4'-benzophenonetetracarboxylic acid dianhydride,
2,2',3,3'-benzophenonetetracarboxylic acid dianhydride,
3,3',4,4'-biphenyltetracarboxylic acid dianhydride,
2,2',3,3'-biphenyltetracarboxylic acid dianhydride,
4,4'-isopropylidenediphthalic anhydride,
3,3'-isopropylidenediphthalic anhydride,
4,4'-oxydiphthalic anhydride,
4,4'-sulfonyldiphthalic anhydride,
3,3'-oxydiphthalic anhydride,
4,4'-methylenediphthalic anhydride,
4,4'-thiodiphthalic anhydride,
4,4'-ethylidenediphthalic anhydride,
2,3,6,7-naphthalenetetracarboxylic acid dianhydride,
1,2,4,5-naphthalenetetracarboxylic acid dianhydride,
1,2,5,6-naphthalenetetracarboxylic acid dianhydride,
benzene-1,2,3,4-tetracarboxylic acid dianhydride,
pyrazine-2,3,5,6-tetracarboxylic acid dianhydride and thiophene-2,3,4,5-tetracarboxylic acid dianhydride.

Most preferably, the organic component is an acid-/ester endcapped polyimide such as that identified as Structure Z in Reaction Scheme C below wherein n is defined within the range from 20 to 30.

The polyimides may be prepared by numerous methods, as known to those skilled in the art. One such method in shown in Reaction Scheme C below:

the two reactants from solvents or formation by hot pressing the reactants.

More particularly, when solution cast, the two components are reacted by dissolving the silsesquioxane and organic component in a common solvent, such as, for example, CH$_2$Cl$_2$, CHCl$_3$, tetrahydrofuran, dioxane, NMP (N-methylpyrrolidinone), DMF (N,N-dimethylformamide), DMAC (N,N-dimethylacetamide) or

REACTION SCHEME C:

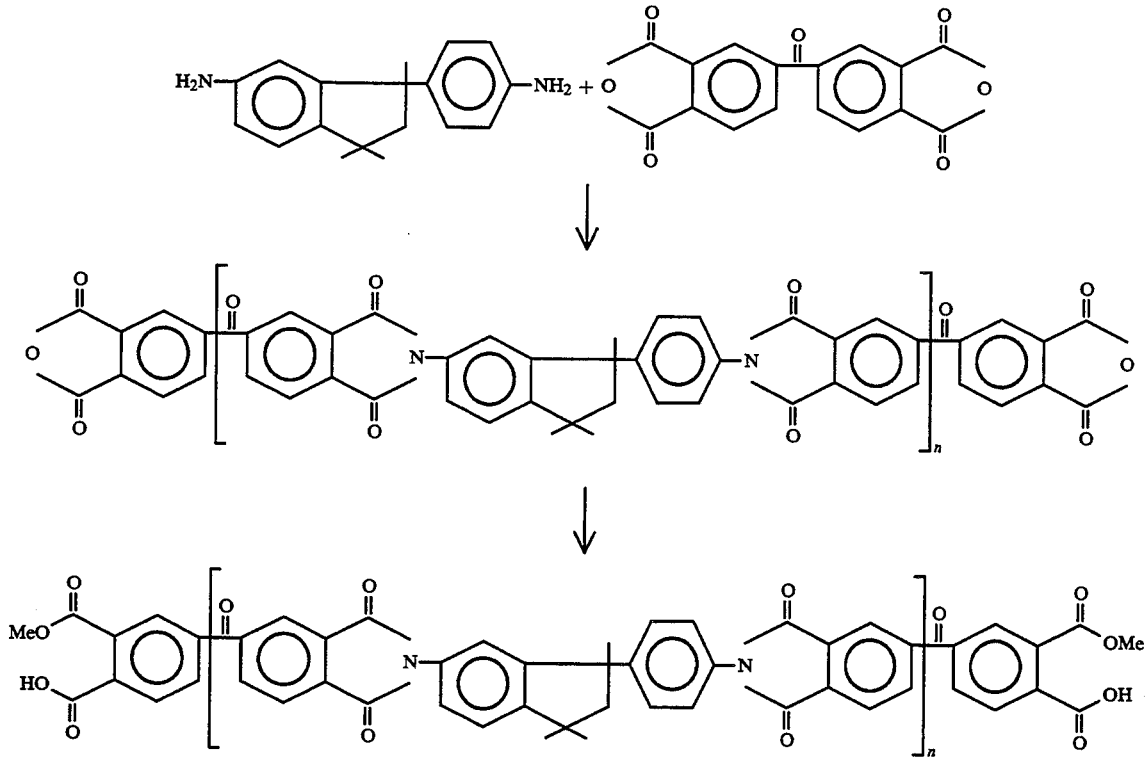

Structure Z

In the first step, of Reaction Scheme C, the dianhydride and diamine are homogeneously mixed in a common solvent, for example, DMF (dimethylformamide). In the second step, chemical dehydration, by methods known to those skilled in the art, is performed to give an anhydride endcapped oligomer. For storage considerations and ease of workup, an alkanol (such as methanol) may be included to react with the anhydride to yield a half ester/half acid endcap, Structure Z. This endcapped oligomer may then be isolated by precipitation into an alkanol (such an methanol).

The components may be combined in varying ratios, depending upon the desired properties of the final product. For example, the composition may be readily prepared by combining about 1 to about 99 parts by weight of the silsesquioxane component with about 99 to 1 parts by weight of organic component, based on the 100 parts of the combined silsesquioxane component and the organic component. Preferably employed is the combination of about 5 to about 90 parts by weight of silsesquioxane, more preferably, from 5 to 70 parts by weight silsesquioxane, and most preferably, 10 to 50 parts by weight silsesquioxane (based on the 100 parts of combined silsesquioxane and organic component).

The compositions of this invention may be prepared by methods known to those skilled in the art, including, for example, formation by solution casting or coating MEK (methylethylketone). The preferred ratio of polymer components to solvent is from about 2-50 weight percent polymer in solvent, more preferably, 3-30 weight percent polymer in solvent, and most preferably, 5-20 weight percent polymer in solvent (with the weight percent based on the two components and the solvent). Solutions of the components are then combined, and mixed to produce a homogenous solution, then cast onto a surface, such as, glass, plastics, ceramics and so on. The solution of components is left on the substrate for a time sufficient for it to dry, preferably from at least 1-20 days. After the reaction between the silsesquioxane component and the organic component, the reactant solution sometimes forms a gel (depending upon reaction conditions). The gel may then be thermally exposed at temperatures of from about 60° C. to about 300° C., more preferably, from about 200° C. to about 280° C., for a time sufficient to completely remove the solvent and affect the reaction between the functional group on the silsesquioxane and organic component reactive endgroup (preferably for at least about 30 to about 360 minutes, more preferably for 60 to 120 minutes).

When the composition is prepared by a hot press method, any equipment known to those skilled in the art may be used. Preferably the components are mixed in solution (such as those solvents described previously) and precipitated as a powder and dried at temperatures less than about 200° C. to remove residual solvent. Alternatively, powders of the organic component and the silsesquioxane may be thoroughly mixed by conventional methods without the use of solvents. Preferably the powder is prepared to about 35 to about 45 mesh size powder, then exposed to heat for a time sufficient for the components to react. Preferably, the exposure to the hot press, or injection molding, may occur at within the temperature range of from about 200° C. to about 400° C. for time period within the range from about 5 minutes to about 30 minutes, at which point thermal reaction has occured between the silsesquioxane and the organic component.

The product is formed by a reaction between the functional organic group of the silsesquioxane and the reactive end group of the previously listed organic components to form a hybrid product having carbon-silicon linkage. When the preferred silsesquioxane and polyimide are employed, an imidization reaction forms an imide product upon curing between the amine functionality on the silsesquioxane and the reactive component end groups. Typically, the novel hybrid material is a homogeneous, transparent composition as evidenced by the ability to read a printed page through about a 0.5 mm thick sample.

The novel composition may be used in a number of applications. Films may be formed which are particularly useful as reinforced plastics, lightweight metal replacements, and as coatings for protective overcoats or protective finishes because of the hybrid composition transparency and high temperature resistance (>than about 200° C.). Other uses for the polymeric composition will be apparent to those skilled in the art.

The following examples are intended to illustrate more fully the nature of the invention without acting as a limitation upon its scope. Other compositions can readily be prepared in light of this disclosure and guiding principles and teachings provided herein.

EXAMPLES

The materials referred to in the examples were obtained as follows: Aminophenyltriethoxysilane, 3-aminopropyltriethoxysilane, phenyltriethoxysilane, phenyltrimethoxysilane, n-propyltriethoxysilane, and poly(phenylpropyl silsesquioxane) were obtained from Huls America, Inc., and diphenylsilane diol was obtained from Aldrich Chemical Co. All silane reagents were used as received. Also obtained from the Synthetic Chemical Division of Eastman Kodak Company was 6-amino-1-(4-aminophenyl)-1,3,3-trimethylphenylindane ("NV"). The 3,3',4,4'-benzophenonetetracarboxylic dianhydride ("BTDA") was obtained from Chriskev, Inc., Leawood, Kans.

Preparation of Functionalized Silsesquioxanes

Various silsesquioxanes were synthesized in a similar manner, varying only by changing the monomer ratios, as shown in Table I. The reaction is described below for the synthesis of 23% aminopropyl("APr")/77% phenyl silsesquioxane ("Ph"), ("APr/Ph").

In a 1 L round bottom flask were placed 100 g (0.5 mole) phenyltrimethoxysilane and 150 mL THF. To this solution was added, with stirring, 124 mL (6.9 mol) distilled water and 2 mL concentrated HCl. The mixture was initially two-phase but became homogeneous in minutes as an exothermic reaction (hydrolysis) occurred. The resulting solution was allowed to react for about 2 h before 33.4 g (0.15 mol) of 3-aminopropyltriethoxysilane was added. The solution turned cloudy and was allowed to stir overnight. Concentrated ammonium hydroxide was added to adjust the pH to about 9. The solvent was removed on a rotary evaporator, and the resulting solid was dissolved in methylene chloride. Residual water was removed using a separatory funnel, and the organic layer was dried over magnesium sulfate. The resulting solution was filtered, and the solvent was removed using a rotary evaporator to produce a white solid in 80% yield. The solid was dried in vacuo at 75° C. overnight.

In some cases, the product initially isolated by solvent removal was insoluble in methylene chloride. In these cases, the product was stripped to dryness on a rotary evaporator (any residual water was poured off), and the resulting product was slurried in methanol. The product was subsequently filtered and would then generally redissolve in tetrahydrofuran. The solution was filtered, and the solvent removed by rotary evaporation to obtain a solid, although in some cases a viscous oil was obtained.

Synthesis of Organic Component Having Reactive Endgroups

In each of the examples, polyimide oligomers, as previously defined by Structure Z, were employed as the organic component. In a dry 3-neck, 1 L round bottom flask equipped with a mechanical stirrer, nitrogen inlet and stopper, 32.87 g of BTDA was dissolved in 250 mL of dry DMF (dimethylformamide). The amount of 26.11 g of NV was dissolved in 250 mL of dry DMF and added quickly to the BTDA solution (Reaction Scheme C outlined previously). The mixture was then stirred at room temperature overnight before 34 mL of acetic anhydride and 44 mL of triethylamine were added. The resulting solution was stirred for approximately 8 h before 10 mL of anhydrous methanol was added. The solution was then stirred overnight, precipitated into methanol, filtered, and air dried. The polymer was finally dried in vacuo at 100° C. overnight. The yield of the oligomer was 49.3 g, with an inherent viscosity=0.37 dL/g at 25° C. 0.5 g/dL in DMAc (N,N-dimethylacetamide). GPC: $M_n=11,100$, $M_w=49,100$ polystyrene equivalent molecular weights. All polyimide oligomers were prepared in an analogous manner by altering the reactant ratios to achieve the desired molecular weight.

Preparation of Hybrid Inorganic/Organic Materials

All the hybrids were prepared in a similar manner. All samples were mixed on a weight percent basis assuming no loss of either the polyimide or silsesquioxane during the processing. Samples were prepared at 10, 20, and 50 weight % loadings of silsesquioxane using polyimide oligomers with $M_n=12,100$ or $M_n=9400$.

Five weight % solutions of the polyimide oligomers were prepared in methylene chloride, with the exception that the APr/Ph sample was dissolved in chloroform. A typical 50/50 weight % mixture was prepared by adding 50 g of the silsesquioxane stock to 50 g of the polyimide oligomer stock (using the same solvent for both stock solutions), followed by stirring for 30 min. The solids concentrations of all solutions were controlled to achieve a uniform film thickness for all samples since mechanical properties are somewhat dependent upon thickness. The solutions were poured into 4"×4" TEFLON ™ casting fixtures, and the fixtures were covered with a glass plate to control drying rates. Several days were required for the samples to dry. The dried samples were cured under a roughing pump vacuum in a quartz lined furnace. Samples were cured for 2 h at 60°, 150°, and finally 200°, 250°, or 275° C. final curing temperature. The temperature ramp rates were 2° C./min.

Sample Nomenclature

A shorthand nomenclature has been adopted in order to identify the hybrid products. The silsesquioxane will be identified by the monomer composition. Four different compositions were prepared, as shown in Table I below. These products are identified as follows:

TABLE I

| | |
|---|---|
| APr/Ph: | 27% aminopropyl/73% phenylsilsesquioxane |
| APr/Pr/Ph: | 15% aminopropyl/12% propyl/73% phenylsilsesquioxane |
| APh/Ph: | 27% aminophenyl/73% phenylsilsesquioxane |
| Pr/Ph: | 27% propyl/73% phenylsilsesquioxane (commercial) (Represents comparison because silsesquioxane is unfunctionalized) |

Structural Identification

APr/Ph:

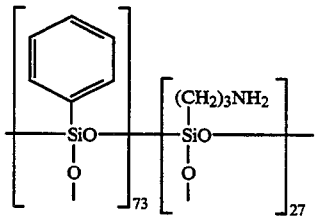

APr/Pr/Ph:

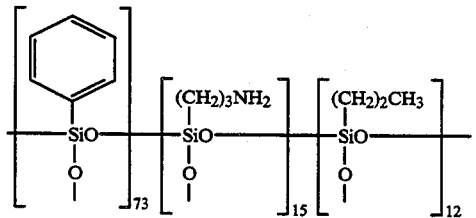

Pr/Ph:

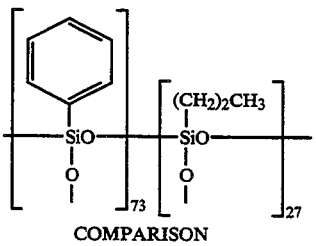

COMPARISON

APh/Ph:

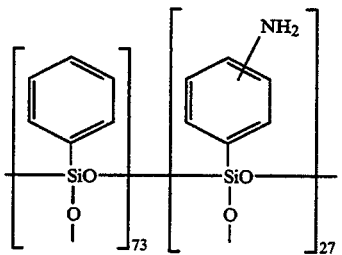

The hybrids will be denoted by the weight percentage and composition of the silsesquioxane. The polyimide oligomer used was a copolymer of NV and BTDA. The molecular weight of the oligomer will be noted in Table II. Thus, a hybrid of the polyimide oligomer with 10 weight percent of the 27% aminophenyl/73% phenylsilsesquioxane would be denoted 10% APh/Ph.

Analytical Methods $^{29}Si$ NMR were obtained at 99.36 MHz on a Bruker AM-500 NMR spectrometer. $^1H$ NMR were obtained on a General Electric Model QE-300 (MHz) spectrometer using $CDCl_3$ as both internal standard and solvent.

Mechanical properties were obtained using the ASTM D638M-III TGST format. Dynamic mechanical thermal analysis was obtained on a Rheometrics Solids Analyzer RSA II at 10 Hz over a temperature range of $-25°$ C. to 300° C.

All hybrids studied showed well defined glass transition temperatures ($T_g$) from DSC in the range of 317°–322° C. (second scan). In some samples annealing peaks were observed due to the previous thermal history. The onset of an exotherm around 350°–400° C. was observed in some cases. These results are summarized in Table II. Changes in $T_g$ with silsesquioxane loading or composition were small, about 5° C. Scans of the silsesquioxane prepolymers did not show $T_g$ or $T_m$ (melting point temperature).

EXAMPLE I

Comparisons

In order to test the approach to the new hybrids prepared by the inventive method, comparison or "blank" reactions were run. The comparisons were prepared with composites made from silsesquioxanes containing no amino functionality (thus could not form the hybrids). This comparison was determinative of whether cross-reaction of the polyimide and the silsesquioxane was necessary for optimum properties. Phenylpropylsilsesquioxane (Pr/Ph) was chosen as the unfunctionalized comparison. This material was commercially available from Huls as an oligomer ($M_w$ about 1000) and is highly soluble in a variety of organic solvents. 29Si NMR indicated that the commercial material consists of about 73% phenyl- and 27% propylsilsesquioxane monomers. Comparative Results are included in the Table II hereinafter.

TABLE II

| | Hybrid Thermal and Dynamic Mechanical Properties | | | |
|---|---|---|---|---|
| sample | cure temp °C. | Tg (DSC) °C. | $T_{max}$ (DSC) °C. | E'plateau$^a$ MPa |
| polyimide | | | | |

TABLE II-continued

Hybrid Thermal and Dynamic Mechanical Properties

| sample | cure temp °C. | Tg (DSC) °C. | T$_{max}$ (DSC) °C. | E'plateau$^a$ MPa |
|---|---|---|---|---|
| | | Mn = 12,100 | | |
| blank | | 324 (e) | 290 | |
| blank | 275 | 320 (e) (ap) | 335 | |
| 5% APr/Ph | 275 | | 355 | 8 × 10$^6$ |
| 10% APr/Ph | | 322 | | |
| 5% APr/Pr/Ph | 275 | 322 | 350 | 10$^5$ |
| 5% APh/Ph | | | 330 | 2 × 10$^6$ |
| 5% APh/Ph | 275 | 322 (e) | 360 | 10$^5$ |
| 10% APh/Ph | 200 | 322 | 355 | 10$^7$ |
| 10% APh/Ph | 275 | 322 | 345–350 | — |
| | | polyimide Mn = 9,400 | | |
| blank | | 332 | | |
| 10% APr/Ph | | 327 | | |
| 10% APr/Pr/Ph | | 314 (ap) | | | e = exotherm
ap = annealing peak
$^a$E'plateau is the tensile modulus above the polymer Tg

EXAMPLE II

Tensile Properties

Tables III and IV list the tensile properties for selected hybrids.

The phenyl content was held constant while the effect of the amount of amine was tested (27% aminopropyl/73% phenyl versus 15% aminopropyl/12% propyl/73% phenyl) as well as the type of amine (27% aminophenyl/73% phenyl versus 27% aminopropyl/73% phenyl). The effects of different curing temperature are also shown.

TABLE III

Polyimide/Silsesquioxane Hybrid Tensile Properties (polyimide M$_n$ = 12,100)

| sample | cure temp °C. | modulus MPa | break stress MPa | break strain % |
|---|---|---|---|---|
| blank | 200 | 1799 | 92 | 6.9 |
| blank$^{\#1}$ | 275 | 1396 | 64 | 5.9 |
| 5% APr/Ph | 200 | 1773 | 86 | 6.1 |
| 5% APr/Ph | 275 | 1779 | 80 | 6.0 |
| 10% APr/Ph | 200 | 1730 | 89 | 7.0 |
| 10% APr/Ph | 275 | 1757 | 87 | 7.0 |
| 5% APr/Pr/Ph | 200 | 1775 | 91 | 6.8 |
| 5% APr/Pr/Ph | 275 | 1725 | 95 | 7.2 |
| 10% APr/Pr/Ph | 200 | 1749 | 86 | 6.7 |
| 10% APr/Pr/Ph | 275 | 1703 | 93 | 7.9 |
| 5% APh/Ph | 200 | 1728 | 88 | 6.5 |
| 5% APh/Ph | 275 | 1802 | 87 | 5.9 |
| 10% APh/Ph | 200 | 1820 | 82 | 5.6 |
| 10% APh/Ph | 275 | 1751 | 78 | 5.2 |
| 50% APh/Ph | 250 | 1883 | 47 | 2.9 |
| 50% Pr/Ph$^{\#2}$ | 250 | 923 | 18 | 2.5 |
| 50% APh*/Ph$^{\#3}$ | 280 | 2314 | 86 | 5.0 |

$^{\#1}$This sample had a foamed core
$^{\#2}$This sample was prepared with an unfunctionalized silsesquioxane
$^{\#3}$APh* represents that the Ph is 5% aminophenyl/95% phenyl silsesquioxane As shown by the data of Table III, the novel compositions show improved mechanical properties at higher firing temperatures. The 50% Pr/Ph substantially degraded at 275° C. Further, higher modulus with low levels of the novel composition were observed.

TABLE IV

Polyimide/Silsesquioxane Hybrid Tensile Properties (polyimide M$_n$ = 9,400)

| sample | cure temp °C. | modulus MPa | break stress MPa | break strain % |
|---|---|---|---|---|
| blank | 200 | 1942 | 63 | 3.9 |
| blank | 275 | 1699 | 69 | 5.2 |
| 5% APr/Ph | 200 | 1783 | 73 | 5.3 |
| 10% APr/Ph | 200 | 1798 | 81 | 6.3 |
| 10% APr/Ph | 275 | 1857 | 87 | 7.1 |
| 5% APh/Ph | 200 | 1723 | 76 | 5.7 |
| 5% APh/Ph | 275 | 1864 | 84 | 6.2 |
| 10% APh/Ph | 200 | 1903 | 74 | 4.9 |
| 10% APh/Ph | 275 | 1802 | 66 | 4.6 |
| 5% APr/Pr/Ph | 200 | 1853 | 85 | 6.6 |
| 5% APr/Pr/Ph | 275 | 1843 | 86 | 6.5 |

As shown by the data of Table IV, the novel compositions show a higher break stress and larger percent strain to break than the blanks.

EXAMPLE IV

For purposes of investigating whether a reaction actually occurred between the silesquioxane and the organic component, a change in solubility of the hybrids test was performed. As a control, samples of the polyimide oligomer were checked for solubility in methylene chloride by sonicating for 15 min. after being heated to various temperatures. The polyimide oligomer remained soluble after heating to 200° C., but became insoluble after heating to 275° C. The hybrid [polyimide oligomer, (M$_n$=9,400)] with 5% APr/Ph cured to 275° C. was insoluble. The hybrid [polyimide oligomer (M$_n$=12,000)] with 5% APr/Ph cured to 200° C. became a swollen gel. These results show that at 200° C. there is a change in solubility in the hybrids which suggests that the proposed reaction is occurring between the polyimide oligomer and amino groups on the silsesquioxanes.

The invention has been described in detail with particular reference to preferred embodiments thereof, but it will be understood that variations and modifications can be effected within the spirit and scope of the invention. All patents, patent applications (published or unpublished, domestic or foreign), scientific literature, books and other prior art cited herein are each incorporated herein by reference for the teaching therein pertinent to this invention.

That which is claimed is:

1. A composition comprising:
   (a) a functionalized silsesquioxane, said silsesquioxane is represented by structure I:

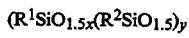
   $(R^1SiO_{1.5})_x(R^2SiO_{1.5})_y$    I wherein $R^1$, $R^2$ and $R^3$ each independently represent substituted or unsubstituted, branched or straight chain $C_1$–$C_{20}$ alkyl, alkenyl, alkynyl groups; $C_6$–$C_{18}$ substituted or unsubstituted aromatic groups;
   wherein said substituents may be selected from —$CO_2R$, —NRH, —$CO_2H$,

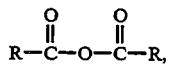

—$NH_2$, halide, or —OH groups (wherein R is a branched or straight, $C_1$–$C_{20}$ alkyl, alkenyl, alkynyl, or $C_6$–$C_{18}$ aromatic group), and
   x is an integer from 0.02 to 0.50,
   y is an integer from 0.98 to 0.02, and
   z is an integer from 0 to 0.50, with the proviso that $R^1$ is functionalized with one or more of the listed substituents, and
   (b) an organic component having endgroups reactive with the functionalized substituents of the silsesquioxane, wherein the organic backbone of the organic component is selected from polyimides, polyquinoxolines, poly ether ketones, poly ether sulfones, or polyesters and the reactive endgroups of the organic component are independently selected from —$CO_2R$, —NRH, —$CO_2H$,

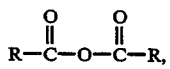

—$NH_2$, halide, or —OH groups (wherein R is a branched or straight, $C_1$–$C_{20}$ alkyl, alkenyl, alkynyl, or $C_6$–$C_{18}$ aromatic group).

2. A composition according to claim 1 wherein $R^1$, $R^2$, $R^3$ are independently selected from phenyl, methyl, ethyl, propyl, or 3-aminopropyl.

3. A composition according to claim 2 wherein $R^2$ is a phenyl, y is from 0.98 to 0.30; $R^1$ is an aminophenyl or aminopropyl and x is 0.02 to 0.30; and $R^2$ (if present) is methyl, ethyl, or propyl and x is from 0 to 0.40.

4. A composition according to claim 3 wherein said organic component is a polyimide represented by structure II:

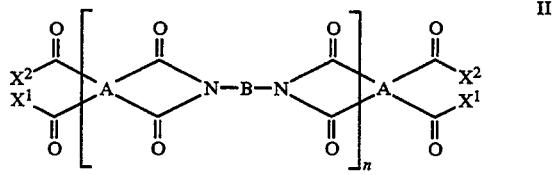

wherein n has a value from about 5 to 100, $X^1$ and $X^2$ may be the same or different defined as $OR^1$ (with $R^1$ as defined previously), OH, or 0 (with the proviso that when $X^1$ is 0, then $X^2$ is omitted to form a cyclic endgroup); A is an aromatic tetra acid dianhydride, and B is an aromatic diamine.

5. A composition according to claim 4 wherein said organic component is an acid/ester endcapped polyimide as represented below:

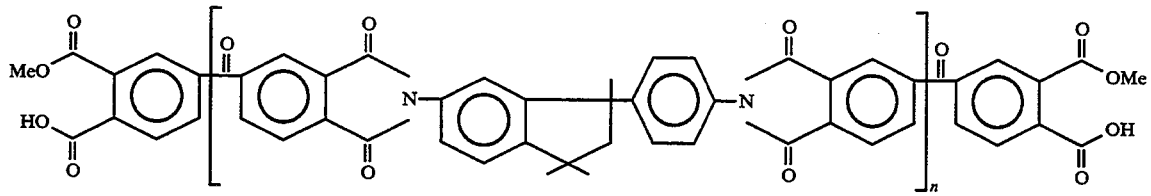

wherein n has a value from 20 to 30.

6. A composition according to claim 1 wherein said organic component is a polyimide represented by structure II:

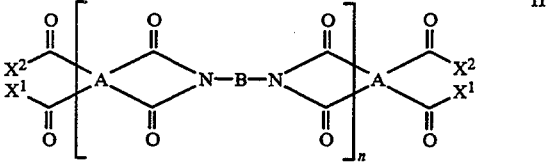

wherein n has a value from about 5 to 100, $X^1$ and $X^2$ may be the same or different defined as $OR^1$ (with $R^1$ represents a substituted or unsubstituted, branched or straight chain $C_1$–$C_{20}$ alkyl, alkenyl, alkynyl groups, or $C_6$–$C_{18}$ aromatic groups);
wherein said substituents may be selected from —$CO_2R$, —NRH, —$CO_2H$,

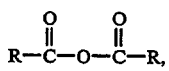

—$NH_2$, halide, or —OH groups (wherein R is a branched or straight, $C_1$–$C_{20}$ alkyl, alkenyl, alkynyl, or $C_6$–$C_{18}$ aromatic group); OH; or O (with the proviso that when $X^1$ is 0, then $X^2$ is omitted to form a cyclic endgroup); A is an aromatic tetra acid dianhydride, and B is an aromatic diamine.

7. A composition according to claim 6 wherein said organic component is an acid/ester endcapped polyimide as represented below:

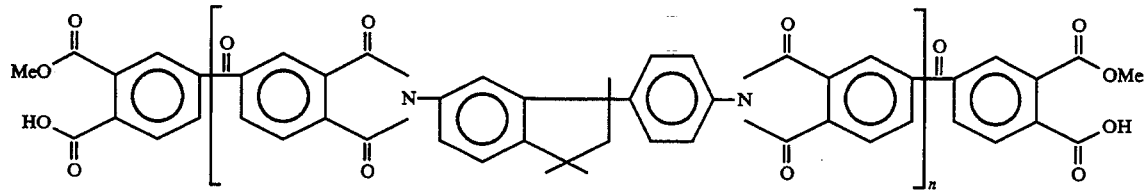

wherein n has a value from 20 to 30.

8. A composition according to claim 7 wherein $R^1$, $R^2$, and $R^3$ of said silsesquioxane are selected from phenyl, methyl, ethyl, propyl, or 3aminopropyl.

9. A composition according to claim 8 wherein said silsesquioxane is present in an amount from about 5 to about 90 parts by weight, and said organic component is present in an amount ranging from about 10 to about 95 parts by weight, based on the combined weight of the silsesquioxane and organic component.

10. A composition according to claim 9 wherein said silsesquioxane is present in an amount from 5 to 70 parts by weight, and said organic component is present in an amount ranging from 95 to 30 parts by weight.

11. A composition according to claim 10 wherein said silsesquioxane is present in an amount from 10 to 50 parts by weight, and said organic component is present in an amount ranging from 90 to 50 parts by weight.

12. A composition according to claim 1 wherein said silsesquioxane is present in an amount from about 5 to about 90 parts by weight, and said organic component is present in an amount ranging from about 10 to about 95 parts by weight, based on the combined weight of the silsesquioxane and organic component.

13. A composition according to claim 11 wherein said silsesquioxane is present in an amount from 5 to 70 parts by weight, and said organic component is present in an amount ranging from 95 to 30 parts by weight.

14. A composition according to claim 13 wherein said silsesquioxane is present in an amount from 10 to 50 parts by weight, and said organic component is present in an amount ranging from 90 to 50 parts by weight.

* * * * *

UNITED STATES PATENT AND TRADEMARK OFFICE
CERTIFICATE OF CORRECTION

PATENT NO. : 5,384,376
DATED : January 24, 1995
INVENTOR(S) : Scott E. Tunney et al.

It is certified that error appears in the above-indentified patent and that said Letters Patent is hereby corrected as shown below:

Column 15, line 5, "$(R^1SiO_{1.5x} (R^2SiO_{1.5})_y$" should read --$(R^1SiO_{1.5})_x (R^2SiO_{1.5})_y [(R^3)_2SiO]_z$--.

Column 17, line 18, "3aminopropyl" should read --3-aminopropyl--.

Signed and Sealed this

Thirteenth Day of June, 1995

Attest:

BRUCE LEHMAN

Attesting Officer     Commissioner of Patents and Trademarks